United States Patent [19]

Larson, Jr.

[11] Patent Number: 5,354,368

[45] Date of Patent: Oct. 11, 1994

[54] HOLT MELT JET INK COMPOSITION

[75] Inventor: Richard J. Larson, Jr., Walpole, N.H.

[73] Assignee: Markem Corporation, Keene, N.H.

[21] Appl. No.: 57,088

[22] Filed: May 4, 1993

[51] Int. Cl.$^5$ .............................................. C09D 11/08
[52] U.S. Cl. .................. 106/22 A; 106/20 D; 106/23 A; 106/30 R
[58] Field of Search ............... 106/20 D, 22 A, 23 A, 106/30 R

[56] References Cited

U.S. PATENT DOCUMENTS

| | | | |
|---|---|---|---|
| Re. 32,411 | 5/1987 | Hutter | 106/30 R |
| Re. 34,029 | 8/1992 | Ball | 106/22 A |
| 3,990,980 | 11/1976 | Kosel | 524/902 |
| 3,991,226 | 11/1976 | Kosel | 430/119 |
| 4,028,128 | 6/1977 | Robertson | 106/23 R |
| 4,251,276 | 2/1981 | Ferree et al. | 106/27 R |
| 4,290,072 | 9/1981 | Mansukhani | 106/20 D |
| 4,328,332 | 4/1982 | Hayes et al. | 528/296 |
| 4,395,524 | 7/1983 | Emmons et al. | 524/555 |
| 4,425,469 | 1/1984 | Emmons et al. | 524/750 |
| 4,717,639 | 1/1988 | Dubin et al. | 430/124 |
| 4,724,002 | 2/1988 | Shibata et al. | 106/23 A |
| 4,781,985 | 11/1988 | Desjarlais | 428/421 |
| 4,820,346 | 4/1989 | Nowak | 106/22 A |
| 4,830,671 | 5/1989 | Frihart et al. | 106/20 D |
| 4,835,208 | 5/1989 | Bail | 106/31 R |
| 4,851,045 | 7/1989 | Taniguchi | 106/22 A |
| 4,857,386 | 8/1989 | Butters et al. | 428/206 |
| 4,878,946 | 11/1989 | Tabayshi et al. | 106/22 A |
| 4,921,899 | 5/1990 | Phan et al. | 524/513 |
| 4,931,095 | 6/1990 | Nowak | 106/22 A |
| 4,950,303 | 8/1990 | Ishii | 8/513 |
| 4,996,252 | 2/1991 | Phan et al. | 524/88 |
| 5,000,786 | 3/1991 | Matsuzaki | 106/22 A |
| 5,006,170 | 4/1991 | Schwarz et al. | 106/22 A |
| 5,039,339 | 8/1991 | Phan et al. | 106/20 R |
| 5,075,364 | 12/1991 | Phan et al. | 524/190 |
| 5,102,717 | 4/1992 | Butters et al. | 428/195 |
| 5,104,449 | 4/1992 | Pavlin | 106/30 R |
| 5,122,187 | 6/1992 | Schwarz et al. | 106/22 A |
| 5,176,745 | 1/1993 | Moore et al. | 106/22 R |
| 5,259,874 | 11/1993 | Miller et al. | 106/30 R |

FOREIGN PATENT DOCUMENTS 475707  3/1992  European Pat. Off. .

Primary Examiner—Helene Klemanski
Attorney, Agent, or Firm—Brumbaugh, Graves, Donohue & Raymond

[57] ABSTRACT

A hot melt jet ink composition comprising a tall oil resin having a high acid number exhibits improved adhesion when printed onto substrates.

70 Claims, No Drawings

HOLT MELT JET INK COMPOSITION

SPECIFICATION

This invention relates to hot melt jet ink compositions. More specifically, this invention is directed to hot melt jet ink compositions having improved, adherence and abrasion resistance characteristics.

BACKGROUND OF THE INVENTION

Typically, ink jet printing involves forming characters on a substrate by ejecting ink droplets from a printhead having one or more nozzles. In order to provide a high quality image, hot melt jet ink compositions which are solid at room temperature, but molten at jetting temperature are used. Unfortunately, such hot-melt jet ink compositions, while capable of providing a high quality image, are readily abraded or deformed upon handling of the printed substrate. Such abrasion and lack of adherence is a problem not only when printing onto porous substrates, such as paper, but is particularly troublesome when applying hot-melt jet ink compositions to nonporous substrates, such as plastic films and coated or noncoated containers.

European Published Application No. 0 475 707 discloses hot melt jet ink compositions containing polyester resins having acid numbers in the range from 1 to 54 and proposes the use of resins having an acid number of 10 or more in combination with mono-and dialkylbenzene-sulfonamides. Such sulfonamides, however, are often incompatible with other hot melt jet ink ingredients.

SUMMARY OF THE INVENTION

Accordingly, it is an object of the invention to provide hot melt jet inks that overcome the above-mentioned disadvantages of the prior art.

Another object of the invention is to provide an improved ink for hot melt jet ink printers that produces print with a sharp image of high resolution which is resistant to abrasion.

These and other objects of the present invention are attained by providing a hot melt jet ink comprising a coloring agent and a tall oil rosin having an acid number of at least 55. Preferably, the total acid number for ink composition is at least 49. As used herein the term "tall oil rosin" includes natural tall oil and wood rosins as well as modified tall oil and wood rosins and tall oil and wood rosin derivatives.

A process for making such a hot melt ink composition comprises the steps of melting a mixture comprising at least one rheology modifier, adding a tall oil rosin having an acid number of at least 55 to the mixture, maintaining the mixture comprising the tall oil rosin in a molten state, and adding a coloring agent.

The ink compositions of the present invention have the property of improved adhesion to a substrate and exhibit low shrinkage on cooling.

DESCRIPTION OF THE PREFERRED EMBODIMENTS

Hot melt jet inks according to the invention which are suitable for use in ink jet printers typically have a melt viscosity in the range of at least 10, preferably at least 20 centipoise, most preferably in the range from 20 to 25 centipoise, at a temperature of at least 105° C., preferably from 115° C. to 140° C., most preferably at 130-°140° C. The ink compositions of the present invention have excellent adhesion to a wide variety of porous and nonporous substrates, for example, plastic films such as polyester, polyethylene or polypropylene; aluminum foil; glass; and paper.

The essential component of the ink composition of the present invention is preferably a tall oil rosin having an acid number of at least 55. Typically, the tall oil rosin has a softening point not less than 60° C., preferably 70° C. to 105° C. Suitable tall oil rosins include modified tackifying tall oil rosins such as Sylvatac® RX, Sylvatac® R85, Sylvatac® 95 and Sylvatac® 295, having acid numbers of 144, 158 and 155 and 161 respectively which are available from Arizona Chemical Company, Panama City, Fla.; Staybelite® and Poly-Pale® having acid numbers of 160 and 140, respectively, available from Hercules Incorporated, Wilmington, Del., Foral® AX and Foral® NC having acid numbers of 160 and 130 respectively, also available from Hercules Incorporated, and Uni-rez® 3300 and Uni-Tac® 70 having an acid number of 83 and 130-145, respectively, available from Union Camp Corporation, Jacksonville, Fla. Most preferred are the Sylvatac® RX and Sylvatac® 295 rosins. Generally, the tall oil resin is present in an amount of at least 30% by weight, preferably at least 40% by weight, most preferably 40% to 60% by weight, of the ink composition. Sylvatac® 295 is present in an amount of at least 20% by weight, preferably at least 30% by weight, most preferably at least 40% by weight of the ink composition.

The ink compositions according to the present invention preferably have a total acid number of at least 49. The ink compositions may further comprise rheology modifiers and antioxidants as well as, of course, coloring agent.

Preferably, the hot melt jet ink of the present invention includes at least one theology modifier comprising at least one plasticizer, which may contribute to increased flexibility, cohesion, and durability of the ink composition. According to the invention the most preferred plasticizer is an ester of benzoic acid. The ester of benzoic acid is present in an amount of no more than 25% by weight, preferably no more than 18% by weight, most preferably 5-15% by weight of the ink composition. A preferred ester of benzoic acid is Benzoflex® 352 available from Velsicol Chemical, Chicago, Ill.

The ink composition may include additional theology modifiers present in an amount of no more than 40% by weight, preferably no more than 30% by weight, most preferably no more than 20% by weight, of the ink composition. These materials may serve to improve scratch and rub resistance, make the ink more durable, reduce viscosity, and reduce tackiness. Suitable additional rheology modifiers include phthalates, citrates, and oxidized polyethylenes. A preferred oxidized polyethylene is Petrolite® E-1040 available from Petrolite Specialty Polymers Group, Tulsa, Okla. Alkylbenzenesulfonamide theology modifiers are not preferred as they are somewhat incompatible with the other ink composition components.

Additional suitable rheology modifiers present in an amount of no more than 50% by weight, preferably no more than 40% by weight, most preferably no more than 30% by weight of the ink composition include stearic acid, lauric acid, linear polyethylene, behenic acid, stearone, aluminum stearate, carnauba wax, microcrystalline waxes, paraffin wax, polyethylene wax, candelilla wax, montan wax, and the like. Preferable additional rheology modifiers comprise long chain alkyl carboxylic acids having the formula

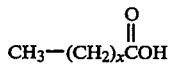

wherein X is 10–60, preferably 20–60, most preferably 38–46.

The alkyl chain may be linear or branched, saturated or unsaturated. A preferred long chain carboxylic acid is Unicid TM 700 available from Petrolite Corporation Polymers Division, Tulsa, Okla.

Because hot melt jet ink compositions prepared in accordance with the invention are heated during jetting, antioxidants to inhibit thermally induced oxidation may be added to the ink composition. Suitable antioxidants include those conventionally used in the art, for example dibutyl hydroxy toluene compounds and the like. Antioxidant is present in the amount of 0.1 to 5% by weight, preferably 0.5 to 3.0% by weight, of the ink composition.

Suitable coloring agents, present in amount of at least 0.1 to 9% by weight, preferably 0.5 to 3% by weight of the ink composition, include pigments and dyes. Any dye or pigment may be chosen provided that it is capable of being dispersed in the ink composition and is compatible with the other ink components. Any pigment particles should have a diameter of less than 1 micron. Preferred dyes include Nitrofast Blue 2B (C.I. Solvent Blue 104), Morplus Magenta 36 (C.I. solvent Red 172), Oracet Yellow GHS, and, for black ink, combinations thereof.

Hot melt jet ink compositions of the present invention are generally prepared by combining together all the ink composition ingredients except for the tall oil rosin and the coloring agent, heating the mixture to its melting point, which generally does not exceed 135° C., and slowly stirring the mixture until homogeneous. The tall oil rosin is slowly added to the mixture which is maintained in the molten state and the resultant molten mixture stirred until uniform. The coloring agent is then added to the mixture with stirring until homogeneously dispersed. The molten mixture is then filtered to remove particles larger than 1 micron in size.

Specific embodiments of hot melt jet ink compositions in accordance with the present invention will now be described in detail. These examples are intended to be illustrative, and the invention is not limited to the materials set forth in these embodiments. All parts are by weight of the ink composition unless otherwise indicated.

EXAMPLE 1

| Ingredient | Parts |
| --- | --- |
| Sylvatac RX | 58 |
| Petrolite E-1040 | 12 |
| Unicid 700 | 18 |
| Benzoflex 352 | 11 |
| Irganox 1010 | 1 |
| Colorant | 1 |

A hot melt jet ink in accordance with Example 1 resulted in a hot melt jet ink composition exhibiting excellent adhesion to substrates and low shrinkage.

Irganox 1010 is a derivative of dibutyl hydroxyhydrocinnamate available from Ciba-Geigy Corporation.

| Ingredient | Parts |
| --- | --- |
| EXAMPLE 2 | |
| Sylvatac 295 | 45 |
| Petrolite E-1040 | 21 |
| Unicid 700 | 18 |
| Benzoflex 352 | 15 |
| Irganox 1010 | 1 |
| Colorant | 1–3 |
| EXAMPLE 3 | |
| Unirez 3300 | 46 |
| Petrolite E-1040 | 27 |
| Unicid 700 | 15 |
| Benzoflex 352 | 11 |
| Irganox 1010 | 1 |
| Colorant | 1–3 |
| EXAMPLE 4 | |
| Unirez 3300 | 35 |
| Petrolite E-1040 | 17.6 |
| Unicid 700 | 27.9 |
| Benzoflex 352 | 18.5 |
| Irganox 1010 | 1 |
| Colorant | 1–3 |
| EXAMPLE 5 | |
| Sylvatac 295 | 43.19 |
| Petrolite E-1040 | 10.84 |
| Unicid 700 | 25.24 |
| Diisononylphthalate | 8.93 |
| Benzoflex 352 | 7.97 |
| Irganox 1010 | .96 |
| Colorant | 2.88 |

Diisononylphthalate (DINP) is manufactured by Aris Technologies and is available from Chemcentral Corporation. DINP when present in an amount of no more than 18% by weight, preferably no more than 15% by weight, most preferably no more than 12% by weight of the ink composition enhances overall ink adhesion and abrasion resistance.

Examples 1–5 were prepared without colorant and the total acid number for the ink composition was determined as follows.

Each ink composition was dissolved in 50:50 toluene/isopropanol and titrated with sodium hydroxide dissolved in isopropanol using phenolphthalein indicator. The following comparative compositions were made with resins having a low acid number.

COMPARATIVE EXAMPLE 6

| Ingredient | Parts |
| --- | --- |
| Escorez 5380 | 48 |
| Petrolite E-1040 | 25 |
| Unicid 700 | 12 |
| Benzoflex 352 | 14 |
| Irganox 1010 | 1 |

Escorez 5380 is available from Exxon Corporation, New Jersey and has an acid number less than 1.

COMPARATIVE EXAMPLE 7

| Ingredient | Parts |
| --- | --- |
| Foral 85 | 52 |
| Petrolite E-1040 | 23 |
| Unicid 700 | 8 |
| Benzoflex 352 | 16 |
| Irganox 1010 | 1 |

Foral 85 has an acid number of 9 and is available from Hercules Corporation, Wilmington, Del.

COMPARATIVE EXAMPLE 8

| Ingredient | Parts |
|---|---|
| Escorez 2101 | 42 |
| Petrolite E-1040 | 33 |
| Unicid 700 | 10 |
| Benoflex 352 | 14 |
| Irganox 1010 | 1 |

Escorez 2101 is available from Exxon Corporation, New Jersey, and has an acid number less than 1.

The total acid number for each of the examples of the invention and the comparative examples is set forth in Table 1.

TABLE 1

| Sample | Total Acid Number |
|---|---|
| Example 1 | 98.3 |
| Example 2 | 89.8 |
| Example 3 | 57.3 |
| Example 4 | 49.6 |
| Example 5 | 92.4 |
| Comparative Example 6 | 21.5 |
| Comparative Example 7 | 19.2 |
| Comparative Example 8 | 20.1 |

The adhesion of the ink was tested in each case by printing onto a porous and nonporous substrate and subjecting it to appropriate manual manipulation of the printed substrate. Comparative examples 6-8 all exhibited poor adhesion. In contrast, examples 1-5 according to the claimed invention exhibited improved adhesion when printed onto substrates.

Although the invention has been described herein with reference to specific embodiments, many modifications and variations therein will readily occur to those skilled in the art. For example additional ingredients such as phosphite stabilizers to retard corrosion of metal surfaces by the ink may be included in hot melt jet ink composition according to the invention. Accordingly, all such variations and modifications are included within the intended scope of the invention.

I claim:

1. A hot melt jet ink composition comprising a tall oil rosin and a rheology modifier comprising an ester of benzoic acid wherein the tall oil rosin has an acid number of at least 55.

2. A hot melt jet ink composition according to claim 1 wherein the total acid number for the ink composition is at least 49.

3. A hot melt jet ink composition according to claim 2 wherein the tall oil rosin is present in an amount of at least 20% by weight of the ink composition.

4. A hot melt jet ink composition according to claim 3 wherein the tall oil rosin is present in an amount of at least 40% by weight of the ink composition.

5. A hot melt jet ink composition according to claim 4 wherein the rheology modifier further comprises an oxidized polyethylene.

6. A hot melt jet ink composition according to claim 4 wherein the ester of benzoic acid is present in an amount of no more than 25% by weight of the ink composition.

7. A hot melt jet ink composition according to claim 5 wherein the oxidized polyethylene is present in an amount of no more than 40% by weight of the ink composition and the ester of benzoic acid is present in an amount of no more than 25% by weight of the ink composition.

8. A hot melt jet ink composition according to claim 7 wherein the rheology modifier further comprises a long chain alkyl carboxylic acid.

9. A hot melt jet ink composition according to claim 8 wherein the long chain alkyl carboxylic acid is present in an amount of no more than 50% by weight of the ink composition.

10. A hot melt jet ink composition according to claim 9 further comprising diisononylphthalate.

11. A hot melt jet ink composition according to claim 10 wherein the diisononylphthalate is present in an amount of no more than 18% by weight of the ink composition.

12. A hot melt jet ink composition comprising 0.1 to 9% by weight coloring agent, at least 20% by weight of a tall oil rosin having an acid number of at least 55, no more than 25% by weight of an ester of benzoic acid, no more than 40% by weight of an oxidized polyethylene, no more than 50% by weight of a long chain carboxylic acid, and 0.1 to 5% by weight of an antioxidant.

13. A hot melt jet ink composition according to claim 12 further comprising diisononylphthalate in an amount of no more than 18% by weight of the ink composition.

14. A process for making a hot melt jet ink composition comprising the steps of:
melting a mixture comprising an ester of benzoic acid,
adding a tall oil rosin having an acid number of at least 55 to the mixture,
maintaining the mixture comprising the tall oil rosin in a molten state, and adding a coloring agent.

15. A process according to claim 14 wherein the hot melt jet ink composition has an acid number of at least 49.

16. A process according to claim 15 wherein the tall oil rosin is present in an amount of at least 20% by weight of the ink composition.

17. A process according to claim 16 wherein the tall oil rosin is present in amount of at least 40% by weight of the ink composition.

18. A process according to claim 17 wherein the theology modifier further comprises an oxidized polyethylene.

19. A process according to claim 17 wherein the ester of benzoic acid is present in an amount of no more than 25% by weight of the ink composition.

20. A process according to claim 18 wherein the oxidized polyethylene is present in an amount of no more than 40% by weight of the ink composition and the ester of benzoic acid is present in an amount of no more than 25% by weight of the ink composition.

21. A process according to claim 20 wherein the rheology modifier further comprises a long chain alkyl carboxylic acid.

22. A process according to claim 21 wherein the long chain alkyl carboxylic acid is present in an amount of no more than 50% by weight of the ink composition.

23. A process according to claim 22 wherein the tall oil resin is added to a mixture further comprising diisononylphthalate.

24. A process according to claim 23 wherein the diisononylphthalate is present in an amount of no more than by weight of the ink composition.

25. A process for making a hot melt ink composition comprising the steps of:

melting a mixture comprising no more than 25% by weight of an ester of benzoic acid, no more than 40% by weight of an oxidized polyethylene, no more than 50% by weight of a long chain carboxylic acid, and 0.1 to 5% by weight of an antioxidant, adding at least 20% by weight of a tall oil rosin having an acid number of at least 55 to the mixture, maintaining the mixture comprising the tall oil rosin in a molten state, and adding 0.1 to 9% by weight coloring agent.

26. A process according to claim 25 wherein the tall oil rosin is added to a mixture further comprising no more than 18% by weight diisononylphthalate.

27. A process for hot melt jet ink printing comprising the step of jetting an ink composition comprising a tall oil rosin and an ester of benzoic acid onto a substrate wherein the tall oil rosin has an acid number of at least 55.

28. A process according to claim 27 wherein the ink composition has a total acid number of at least 49.

29. A hot melt jet ink composition comprising a tall oil rosin and at least one material selected from the group consisting of phthalate, citrate, and oxidized polyethylene, wherein the tall oil rosin has an acid number of at least 55.

30. A hot melt jet ink composition according to claim 29 comprising a phthalate.

31. A hot melt jet ink composition according to claim 30 comprising diisononylphthalate.

32. A hot melt jet ink composition according to claim 31 wherein the total acid number for the ink composition is at least 49.

33. A hot melt jet ink composition according to claim 32 wherein the tall oil rosin is present in an amount of at least 20% by weight of the ink composition.

34. A hot melt jet ink composition according to claim 33 wherein the tall oil rosin is present in an amount of at least 40% by weight of the ink composition.

35. A hot melt jet ink composition according to claim 34 wherein the diisononylphthalate is present in an amount of no more than 18% by weight of the ink composition.

36. A hot melt jet ink composition according to claim 35 wherein the diisononylphthalate is present in an amount of no more than 15% by weight of the ink composition.

37. A hot melt jet ink composition according to claim 36 wherein the diisononylphthalate is present in an amount of no more than 12% by weight of the ink composition.

38. A hot melt jet ink composition according to claim 35 further comprising an oxidized polyethylene 39. A hot melt jet ink composition according to claim 38 wherein the oxidized polyethylene is present in an amount of no more than 40% by weight of the ink composition.

40. A hot melt jet ink composition according to claim 39 further comprising a long chain alkyl carboxylic 41. A hot melt jet ink composition according to claim 40 wherein the long chain carboxylic acid is present in an amount of no more than 50% by weight of the ink composition.

42. A hot melt jet ink composition comprising a tall oil rosin and at least one material selected from the group consisting of carnauba wax, microcrystalline wax, polyethylene wax, candelilla wax, montan wax, and a long chain alkyl carboxylic acid having the formula

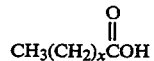

wherein X is 20 to 60, wherein the tall oil rosin has an acid number of at least 55.

43. A hot melt jet ink composition according to claim 42 wherein the total acid number for the ink composition is at least 49.

44. A hot melt jet ink composition according to claim 43 comprising a long chain alkyl carboxylic acid having the formula

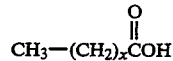

wherein X is 20 to 60.

45. A hot melt jet ink composition according to claim 43 wherein the tall oil rosin is present in an amount of at least 20% by weight of the ink composition.

46. A hot melt jet ink composition according to claim 45 wherein the tall oil rosin is present in an amount of at least 40% by weight of the ink composition.

47. A process for making a hot melt jet ink composition comprising the steps of:

melting a mixture comprising at least one material selected from the group consisting of phthalate, citrate and oxidized polyethylene, adding a tall oil rosin having an acid number of at least 55 to the mixture, maintaining the mixture comprising the tall oil rosin in a molten state, and adding a coloring agent.

48. A process for making a hot melt jet ink composition according to claim 47 comprising a phthalate.

49. A process for making a hot melt jet ink composition according to claim 48 comprising diisononylphthalate.

50. A process for making a hot melt jet ink composition according to claim 49 wherein the total acid number for the ink composition is at least 49.

51. A process for making a hot melt jet ink composition according to claim 50 wherein the tall oil rosin is present in an amount of at least 20% by weight of the composition.

52. A process for making a hot melt jet ink composition according to claim 51 wherein the tall oil rosin is present in an amount of at least 40% by weight of the composition.

53. A process for making a hot melt jet ink composition according to claim 52 wherein the diisononylphthalate is present in an amount of no more than 18% by weight of the ink composition.

54. A process for making a hot melt jet ink composition according to claim 53 wherein the diisononylphthalate is present in an amount of no more than 15% by weight of the ink composition.

55. A process for making a hot melt jet ink composition according to claim 54 wherein the diisononylphthalate is present in an amount of no more than 12% by weight of the ink composition.

56. A process for making a hot melt jet ink composition according to claim 53 wherein the mixture further comprises an oxidized polyethylene.

57. A process for making a hot melt jet ink composition according to claim 56 wherein the oxidized polyethylene is present in an amount of no more than 40% by weight of the ink composition.

58. A process for making a hot melt jet ink composition according to claim 57 further comprising a long chain alkyl carboxylic acid.

59. A process for making a hot melt jet ink composition according to claim 58 wherein the long chain carboxylic acid is present in an amount of no more than 50% by weight of the ink composition.

60. A process for making a hot melt jet ink composition comprising the steps of:

melting a mixture comprising at least one material selected from the group consisting of carnauba wax, microcrystalline wax, polyethylene wax, candelilla wax, montan wax, and a long chain alkyl carboxylic acid having the formula

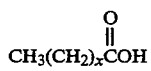

wherein X is 20 to 60, adding a tall oil rosin having an acid number of at least 55 to the mixture, maintaining the mixture comprising the tall oil rosin in a molten state, and adding a coloring agent.

61. A process for making a hot melt jet ink composition according to claim 60 wherein the total acid number for the ink composition is at least 49.

62. A process for making a hot melt jet ink composition according to claim 61 comprising a long chain alkyl carboxylic acid having the formula

wherein X is 20 to 60.

63. A process for making a hot melt jet ink composition according to claim 61 wherein the tall oil rosin is present in an amount of at least 20% by weight of the composition.

64. A process for making a hot melt jet ink composition according to claim 63 wherein the tall oil rosin is present in an amount of at least 40% by weight of the composition.

65. A process for hot melt jet ink printing comprising the step of jetting an ink composition comprising a tall oil rosin and at least one material selected from the group consisting of phthalate, citrate and oxidized polyethylene wherein the tall oil rosin has an acid number of at least 55.

66. A process for hot melt jet ink printing according to claim 65 wherein the ink composition comprises diisononylphthalate.

67. A process for hot melt jet ink printing according to claim 66 wherein the ink composition has a total acid number of at least 49.

68. A process for hot melt jet ink printing comprising the step of jetting an ink composition comprising a tall oil rosin and at least one material selected from the group consisting of carnauba wax, microcrystalline wax, polyethylene wax, candelilla wax, montan wax, and a long chain alkyl carboxylic acid having the formula

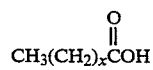

wherein X is 20 to 60, wherein the tall oil rosin has an acid number of at least 55.

69. A process for hot melt jet ink printing according to claim 68 wherein the ink composition has a total acid number of at least 49.

70. A process for hot melt jet ink printing according to claim 69 wherein the ink composition comprises a long chain alkyl carboxylic acid having the formula

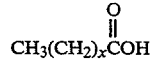

wherein X is 20 to 60.

* * * * *

UNITED STATES PATENT AND TRADEMARK OFFICE
CERTIFICATE OF CORRECTION

PATENT NO. : 5,354,368

DATED : October 11, 1994

INVENTOR(S) : Richard J. Larson, Jr.

Page 1 of 2

It is certified that error appears in the above-indentified patent and that said Letters Patent is hereby corrected as shown below:

First page, Item 54, and col. 1, first line, "HOLT" should read --HOT--

Col. 1, line 7, "improved," should read --improved--

Col. 2, line 38, "theology" should read --rheology--

Col. 2, line 49, "theology" should read --rheology--

Col. 2, line 60, "theology" should read --rheology--

Col. 5, line 9, "Benoflex" should read --Benzoflex--

Col. 6, line 26, "composition" should read --composition.--

Col. 6, line 45, "theology" should read --rheology--

Col. 6, line 66, "than" should read --than 18%--

Col. 7, line 18, "tail oil" should read --tall oil--; and

UNITED STATES PATENT AND TRADEMARK OFFICE
CERTIFICATE OF CORRECTION

PATENT NO. : 5,354,368

DATED : October 11, 1994

INVENTOR(S) : Richard J. Larson, Jr.

It is certified that error appears in the above-indentified patent and that said Letters Patent is hereby corrected as shown below:

Col. 7, line 60, "carboxylic" should read --carboxylic acid.--.

Signed and Sealed this

Seventh Day of February, 1995

Attest:

BRUCE LEHMAN

Attesting Officer      Commissioner of Patents and Trademarks